S. C. LYONS.
WATER-WHEEL.

No. 170,285. Patented Nov. 23, 1875.

WITNESSES:
A. Bennerendorf
A. F. Terry

INVENTOR:
S. C. Lyons
BY
ATTORNEYS.

UNITED STATES PATENT OFFICE.

SAMUEL C. LYONS, OF BENNINGTON, VERMONT.

IMPROVEMENT IN WATER-WHEELS.

Specification forming part of Letters Patent No. 170,285, dated November 23, 1875; application filed May 8, 1875.

*To all whom it may concern:*

Figure 1:
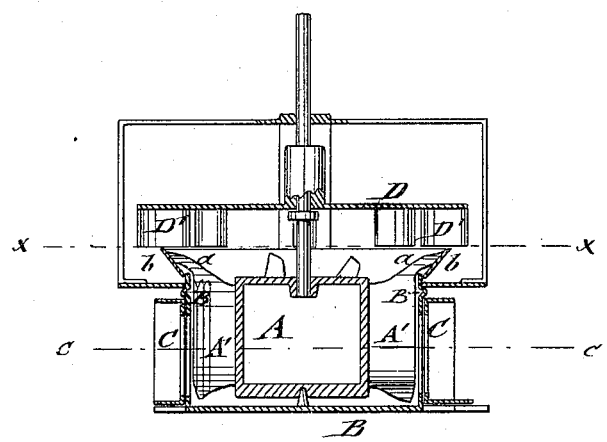
Figure 2:
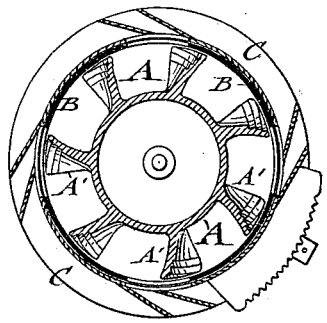
Figure 3:
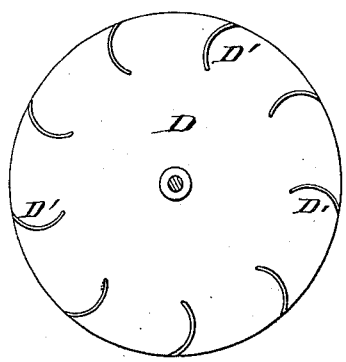

Be it known that I, SAMUEL C. LYONS, of Bennington, in the county of Bennington and State of Vermont, have invented a new and Improved Water-Wheel, of which the following is a specification:

In the accompanying drawing, Figure 1 represents a vertical central section of my improved water-wheel; Fig. 2, a horizontal section of the same on the line *c c*, Fig. 1; and Fig. 3, a horizontal section on the line *x x*, showing construction of auxiliary top wheel.

Similar letters of reference indicate corresponding parts.

The invention will first be described in connection with drawing, and then pointed out in the claims.

In the drawing, A represents a water-wheel, which turns, in the customary manner, with its upright main shaft in bottom and top bearings. A case, B, around the wheel A, with suitable chute-openings for the buckets, supports, on a bottom rim or bearing, the adjustable gate-cylinder C, that is set to full or partial gate in the customary manner, by rack-pinion and crank-shaft. The water enters, through the tangential chutes of the gate, directly to the inside of the wheel-surrounding case, and then on the buckets of the wheel. The buckets A' are curved to pass the water readily upward, and are provided at their upper ends with outwardly-extending lips *a*, to which an inverted conical rim, *b*, is attached, which encircles the upper edge of the case B. A top wheel, D, is seated loosely on a support of the wheel-shaft, turning readily thereon, the hollow hub being of such size that the wheel may be raised by the issuing water like a float, so as not to form an obstruction to a powerful head of water. Arc-shaped buckets D' are arranged at the bottom of top wheel D, immediately above the conical rim *b* of the wheel, so that the unspent power still remaining in the water may be utilized by setting the auxiliary top wheel in motion and transmitting the power, by belt, gearing, or otherwise, to the wheel-shaft or other driving-shaft.

In case of high heads of water, two or more auxiliary top wheels may be employed on the main shaft, for the complete utilization of the surplus power.

Having thus described my invention, I claim as new and desire to secure by Letters Patent—

1. The buckets of the wheel, having outwardly-extending lips at upper ends, in connection with a conical wheel-case-encircling rim, for conveying water to auxiliary top wheel, substantially as specified.

2. The combination of a water-wheel, provided with conical rim at upper ends of buckets, with one or more floating auxiliary top wheels, having arc-shaped buckets for utilizing power of issuing water, substantially as and for the purpose set forth.

SAMUEL C. LYONS.

Witnesses:
JAMES B. MEACHAM,
H. M. HARRIS.